(12) United States Patent
Brys et al.

(10) Patent No.: US 8,346,636 B2
(45) Date of Patent: Jan. 1, 2013

(54) PROCESSING SYSTEM FOR ACQUIRING AND REPORTING COMPLIANCE WITH DATA SECURITY REQUIREMENTS

(75) Inventors: Dawn M. Brys, Marietta, GA (US); Sabrina Hagberg, Greenwood Village, CO (US); Shirley McCulloch, Coral Springs, FL (US); Carol Walnut, Marietta, GA (US); Mary Meade-Koslen, Marietta, GA (US); Michael Hamian, Melville, NY (US); David J. Tuck, Melville, NY (US); Luanne Gallagher, Melville, NY (US); Ashok N. Shenoy, Central Islip, NY (US); Barbara Marx, Kings Park, NY (US)

(73) Assignee: First Data Corporation, Greenwood Village, CO (US)

( * ) Notice: Subject to any disclaimer, the term of this patent is extended or adjusted under 35 U.S.C. 154(b) by 923 days.

(21) Appl. No.: 11/923,113

(22) Filed: Oct. 24, 2007

(65) Prior Publication Data
US 2009/0112643 A1    Apr. 30, 2009

(51) Int. Cl.
*G06Q 40/00*    (2006.01)
(52) U.S. Cl. ................. 705/34; 705/39; 705/44
(58) Field of Classification Search ............ 705/39, 705/34, 44
See application file for complete search history.

(56) References Cited

U.S. PATENT DOCUMENTS

| | | | |
|---|---|---|---|
| 6,026,379 A | 2/2000 | Haller et al. | |
| 6,557,009 B1 | 4/2003 | Singer et al. | |

OTHER PUBLICATIONS

U.S. Appl. No. 11/627,915, filed Jan. 26, 2007.
U.S. Appl. No. 10/611,656, filed Jun. 30, 2003.
PCT International Search Report and Witten Opinion mailed Dec. 16, 2008; International Application No. PCT/US 08/80787, 10 pages.

*Primary Examiner* — Daniel Felten
(74) *Attorney, Agent, or Firm* — Kilpatrick Townsend & Stockton LLP

(57) ABSTRACT

Methods, systems, and machine-readable media are disclosed for tracking and reporting information related to compliance with a set of security requirements by one or more entities handling financial transaction information. According to one embodiment, a system can comprise one or more acquirer systems, each adapted to process information related to a plurality of financial transactions for entities involved in the transaction. A tracking and reporting system can be communicatively coupled with each of the acquirer systems. The tracking and reporting system can be adapted to collect at least a subset of the information related to the plurality of financial transactions, collect compliance information related to the entities involved in the transaction, the compliance information for each entity indicating that entity's compliance with the set of security requirements, and generate one or more reports based on the information related to the plurality of financial transactions and the compliance information.

16 Claims, 7 Drawing Sheets

PROCESSING SYSTEM FOR ACQUIRING AND REPORTING COMPLIANCE WITH DATA SECURITY REQUIREMENTS

BACKGROUND OF THE INVENTION

Embodiments of the present invention generally relate to managing and securing data. More specifically, embodiments of the present invention relate to methods and systems for acquiring and reporting data related to compliance with a set of requirements for securing stored data.

Various types of financial transactions, including for example consumer purchases or payments made using credit cards, debit cards, checks, or other instruments other than cash, typically involve a number of different entities. For example, the primary parties to the transaction include the consumer and the merchant or other supplier of the goods or services being purchased or paid for. Also included is the financial institution issuing the instrument being used, often referred to as the issuing financial institution. An acquirer can act as an intermediary between the issuing financial institution and the merchant.

For example, a typical credit card transaction in which a consumer makes a purchase from a merchant using a credit card involves the following steps. First, the merchant calculates the amount of the transaction or purchase and seeks payment from the cardholder. The cardholder then presents the merchant with his/her credit card. The merchant then runs the credit card through a point of sale terminal. The point of sale terminal captures credit card and sales information and sends such information together with an authorization request to the acquirer. The acquirer, in turn, processes the information received from the point of sale terminal and forwards any relevant information and the authorization request to the issuing financial institution. The issuing financial institution processes the relevant information and the authorization request to determine whether the transaction should be authorized. The issuing financial institution then sends an approval or denial code back to the acquirer. The acquirer relays the approval or denial code to the point of sale terminal for use by the merchant. If the transaction is authorized, the cardholder is allowed to consummate the transaction with the merchant. Typically, at a later time, the accounts maintained by the issuer and the acquirer are settled and reconciled. The end result is that the issuer transfers the transaction amount minus a fee to the acquirer. The acquirer then deducts a fee from the amount received from the issuer. The remaining amount is then transferred by the acquirer to the merchant's account. The issuer also bills the cardholder for the transaction amount by sending the cardholder a credit card statement. The cardholder is typically billed by the issuer on a monthly cycle.

Thus, the information related to the transaction is processed and/or stored by a number of different entities including the merchant and the acquirer. In some cases, other parties, such as Third Party Providers (TPPs), Value-Added Resellers (VARs) and Independent Sales Organizations (ISOs), may also be involved in the transaction and/or process or maintain information related to the transaction. For example, third-party merchant services providers offer transaction processing services to a number of banks and/or acquirers. In addition to managing the processing and recording of card transactions, such a third-party provider also manages information regarding which card products and transaction types a particular one of its acquiring bank clients is allowed to accept, in addition to information about each merchant.

Various industry mandates require that any entity that processes, stores, or transmits cardholder data comply with requirements for properly securing this data. In some cases, fines or penalties may be imposed by various industry associations for failure to comply with the requirements. Currently, channels through which this information pass do not have a systematic way to capture, maintain and manage the status of compliance for merchants and/or other entities such as TPPs. For example, today the most accurate way to identify the TPP is to extract merchant information from incoming authorization messages submitted by the TPP. For merchant reporting and tracking the process is manual and typically tracked on excel spreadsheets. In addition, each channel can have a different system for managing and tracking merchant and TPP compliance. Thus, there is not only inconsistency in reporting methods, but there is no central database or system to create high-level reporting and monitoring to identify merchants or TPPs that are at high risk of non-compliance. Hence, there is a need in the art for improved methods and systems for acquiring and reporting data related to compliance with a set of requirements for securing stored data.

BRIEF SUMMARY OF THE INVENTION

Methods, systems, and machine-readable media are disclosed for tracking and reporting information related to compliance with a set of security requirements by one or more entities handling financial transaction information. According to one embodiment, a system for tracking and reporting information related to compliance with a set of security requirements by one or more entities handling financial transaction information can comprise one or more acquirer systems. Each of the acquirer systems can be adapted to process information related to a plurality of financial transactions for entities involved in the transaction. A tracking and reporting system can be communicatively coupled with each of the acquirer systems. The tracking and reporting system can be adapted to collect at least a subset of the information related to the plurality of financial transactions, collect compliance information related to the entities involved in the transaction, the compliance information for each entity indicating that entity's compliance with the set of security requirements, and generate one or more reports based on the information related to the plurality of financial transactions and the compliance information.

The system can also include a web server communicatively coupled with the tracking and reporting system. The web server can be adapted to receive the one or more reports from the tracking and reporting system and present the one or more reports as one or more web pages. The web server can also be adapted to provide an interface for receiving the compliance information from a user. The tracking and reporting system can be adapted to receive the compliance information from the web server.

The tracking and reporting system can further comprise a central data repository. The central data repository can be adapted to maintain the information related to the plurality of financial transactions and the compliance information. In such a case, the tracking and reporting system can generate the one or more reports based on the information related to the plurality of financial transactions and the compliance information stored in the central repository.

Each acquirer system can be adapted to execute an extraction process. The extraction process can be adapted to monitor the information related to the plurality of financial transactions processed by the acquirer system and extract the subset of the information related to the plurality of financial transactions. The extraction process can be further adapted to send the subset of the information related to the plurality of financial transactions to the tracking and reporting system. The tracking and reporting system can be adapted to receive the subset of the information related to the plurality of financial transactions from the extraction process of the acquirer system and write the subset of the information related to the plurality of financial transactions to the central data repository. In some cases, the tracking and reporting system can be further adapted to first determine whether the subset of the information related to the plurality of financial transactions corresponds to an entity registered with the tracking and reporting system. In such a case, the tracking and reporting system can write the subset of the information related to the plurality of financial transactions to the central data repository in response to determining the subset of the information related to the plurality of financial transactions corresponds to an entity registered with the tracking and reporting system.

According to another embodiment, a method of tracking compliance with a set of security requirements by one or more entities handling financial transaction information can comprise collecting information related to a financial transaction from at least one acquirer system processing the information related to the financial transaction. Collecting information related to the financial transaction from at least one acquirer system can comprise receiving the information related to the financial transaction from the at least one acquirer system, determining whether the information related to the financial transaction corresponds to a registered entity, and in response to determining the information related to the financial transaction corresponds to a registered entity, writing the information related to the financial transaction in a central data repository.

Compliance information related to the entities involved in the transaction can also be collected. The compliance information for each entity can indicate that entity's compliance with the set of security requirement. The compliance information related to the entities involved in the transaction can be received via a web-based interface. The compliance information related to the entities involved in the transaction can be stored in a central data repository.

One or more reports can be generated based on the information related to the financial transaction and the compliance information. Generating the one or more reports can comprise generating one or more web pages. In some cases, generating one or more reports can be based on the information related to the financial transaction and/or the compliance information stored in the central data repository.

According to yet another embodiment, a machine-readable medium can have stored thereon a series of instructions which, when executed by a processor, causes the processor to track compliance with a set of security requirements by collecting information related to a financial transaction from at least one acquirer system processing the information related to the financial transaction. Collecting information related to the financial transaction from at least one acquirer system can comprise receiving the information related to the financial transaction from the at least one acquirer system, determining whether the information related to the financial transaction corresponds to a registered entity, and in response to determining the information related to the financial transaction corresponds to a registered entity, writing the information related to the financial transaction in a central data repository.

Compliance information related to the entities involved in the transaction can also be collected. The compliance information for each entity can indicate that entity's compliance with the set of security requirement. The compliance information related to the entities involved in the transaction can be received via a web-based interface. The compliance information related to the entities involved in the transaction can be stored in a central data repository.

One or more reports can be generated based on the information related to the financial transaction and the compliance information. Generating the one or more reports can comprise generating one or more web pages. In some cases, generating one or more reports can be based on the information related to the financial transaction and/or the compliance information stored in the central data repository.

DETAILED DESCRIPTION OF THE INVENTION

Figure 1:
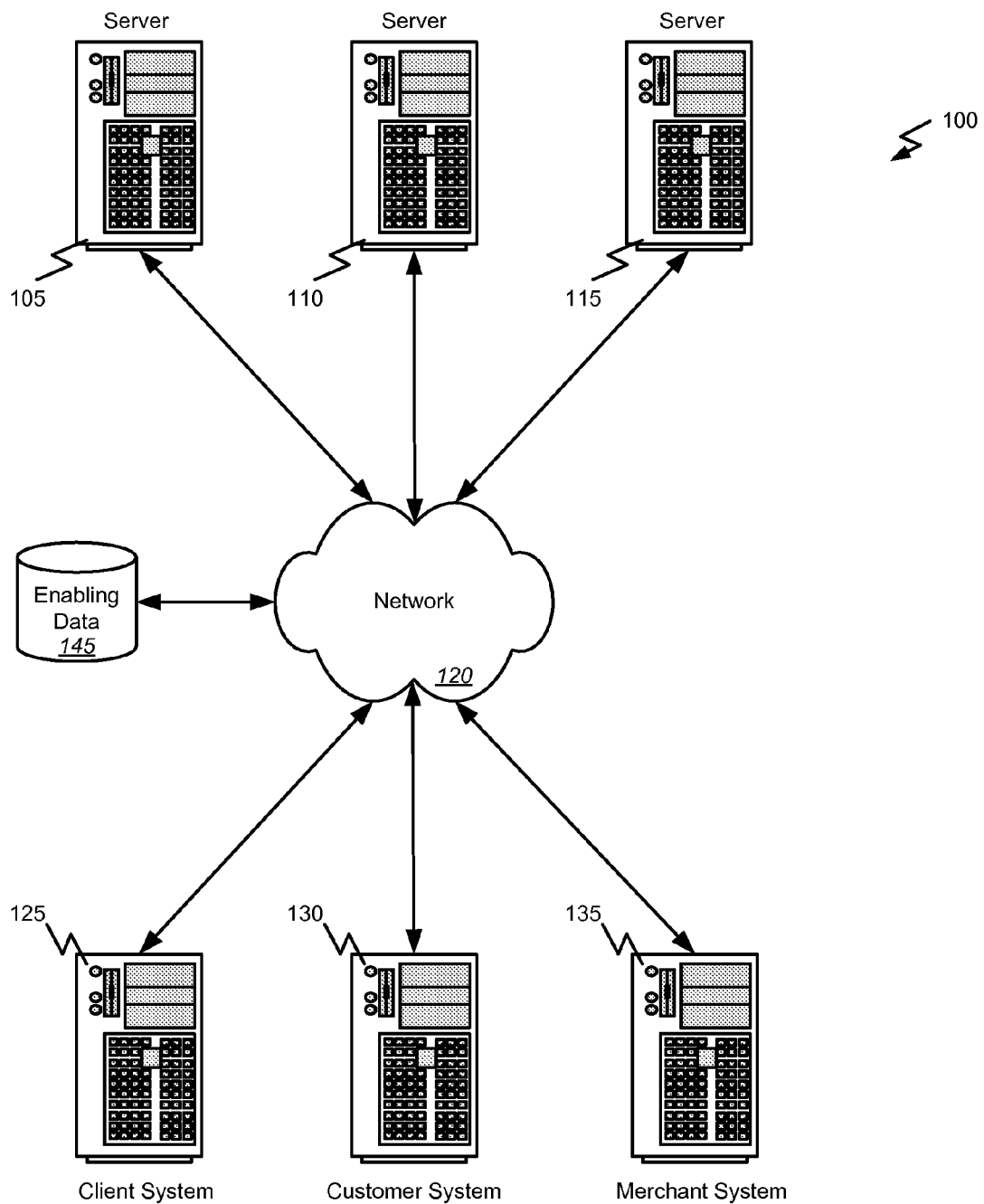
FIG. 1 is a block diagram illustrating an exemplary environment in which embodiments of the present invention may be implemented.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Embodiments of the invention provide methods and systems for acquiring and reporting data related to compliance with a set of requirements for securing stored data. In some such embodiments, the processes are executed by an entity on behalf of one or more client organizations. The description below sometimes provides illustrations that use an example where a client organization is a financial institution, but there is no such requirement for the invention and the methods are intended also to be applicable to other types of organizations that make use of large collections of data. For example, embodiments of the invention may also be used for managing health-care documents or information.

The description herein sometimes refers to "clients" and to "customers." Reference to "clients" is intended to refer to persons, i.e. individuals, entities, or their agents, on whose behalf a set of information is managed. Reference to "customers" or "consumer" is intended to refer to persons, i.e. individuals, entities, or their agents, who are the subject of or related to that information. Thus, merely for purposes of illustration, in the case where the information comprises credit-card account records for a credit card issued to Mr.

Jones by Bank A, Bank A corresponds to a client and Mr. Jones corresponds to a customer or consumer.

In describing embodiments of the invention, reference is sometimes made to other terms having specific intended meanings. For example, as used herein, the term "payment network" refers herein to an infrastructure that supports that exchange of data in implementing payment transactions. It is anticipated that the data exchange typically proceeds between merchants and financial institutions. Examples of existing commercial networks that are included within the definition of "payment network" include the STAR/MAC network, the NYCE® network, the VISA® network, and the MasterCard® network.

The term "machine-readable medium" includes, but is not limited to portable or fixed storage devices, optical storage devices, wireless channels and various other mediums capable of storing, containing or carrying instruction(s) and/ or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The terms "real time" or "near real time" are used herein to refer to a process or action that occurs within a relatively short time. Importantly, the terms real time and near real time are not intended to imply an immediate or instantaneous results or action. Rather, the terms are used to refer to process or actions that can be performed relatively quickly such as within several seconds or minutes.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the present invention provide methods, systems, and machine-readable media for acquiring and reporting data related to compliance with a set of requirements for securing stored data. Generally speaking, embodiments of the present invention can include a central database. Information in the database can be accessible via a web-based tool that will allow acquirers and parties to more accurately track and monitor the progress of compliance to better assess and manage risks associated with non-compliance. Various embodiments provide a user-friendly, web-based tool that houses merchant and third-party provider information by each individual channel, with global acquirer access. The tool can also provide the ability to create and generate ad-hoc and standard reports. In summary, embodiments of the present invention can be used to create a more accurate, comprehensive and automated process to determine that critical data security industry mandates are properly adhered to so that users can better manage risk, exposure and financial liability associated with non-compliance with the imposed security requirements.

FIG. 1 is a block diagram illustrating an exemplary environment in which embodiments of the present invention may be implemented. In this example, the system can include one or more server computers 105, 110, 115 which can be general purpose computers and/or specialized server computers (including, merely by way of example, PC servers, UNIX servers, mid-range servers, mainframe computers rack-mounted servers, etc.). One or more of the servers (e.g. 130) may be dedicated to running applications, such as a business application, a web server, application server, etc. Such servers may be used to execute a plurality of processes related to financial transactions of one or more consumers on behalf of one or more client financial institutions. For example, one or more of the servers 105, 110, 115 may execute one or more processes for recording transactions on a credit card issued to the consumer by the financial institution. Other processes may provide for paying a merchant for the consumer's purchase, billing the consumer, etc The applications can also include any number of applications for controlling access to resources of the servers 105, 110, 115.

In some embodiments, the system 100 may also include a network 120. The network may can be any type of network familiar to those skilled in the art that can support data communications using any of a variety of commercially-available protocols, including without limitation TCP/IP, SNA, IPX, AppleTalk, and the like. Merely by way of example, the network 120 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g. a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system 100 can include one or more user computers which may be used to operate a client, whether a dedicate application, web browser, etc. For example, the user computers can include a client system 125 operated by a client financial institution, a customer system 130 operated by a customer or consumer, a merchant system 135 operated by a merchant or vendor, etc. The user computers 125, 130, 135 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 125, 130, 135 may also have any of a variety of applications, including one or more development systems, database client and/or server applications, and web browser applications. Alternatively, the user computers 125, 130, 135 may be any other electronic device, such as a thin-client computer, Internet-enabled mobile telephone, and/or personal digital assistant, capable of communicating via a network and/or displaying and navigating web pages or other types of electronic documents. Although the exemplary system 100 is shown with three user computers, any number of user computers may be supported.

The system 100 may also include one or more databases or repositories of enabling data 145. The database(s) of enabling data 145 may reside in a variety of locations. By way of example, a database 145 may reside on a storage medium local to (and/or resident in) one or more of the computers 105, 110, 115, 125, 130. Alternatively, it may be remote from any or all of the computers 105, 110, 115, 125, 130, and/or in communication (e.g. via the network 120) with one or more of these. In a particular set of embodiments, the database 145 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 145 may be a relational database that is adapted to store, update, and retrieve data in response to SQL-formatted commands. The repository of enabling data 145 can include a wide variety of information related to financial transactions related to the consumer and/or specified by different entities such as merchants, financial institutions, third-party advertisers, etc.

Figure 2:
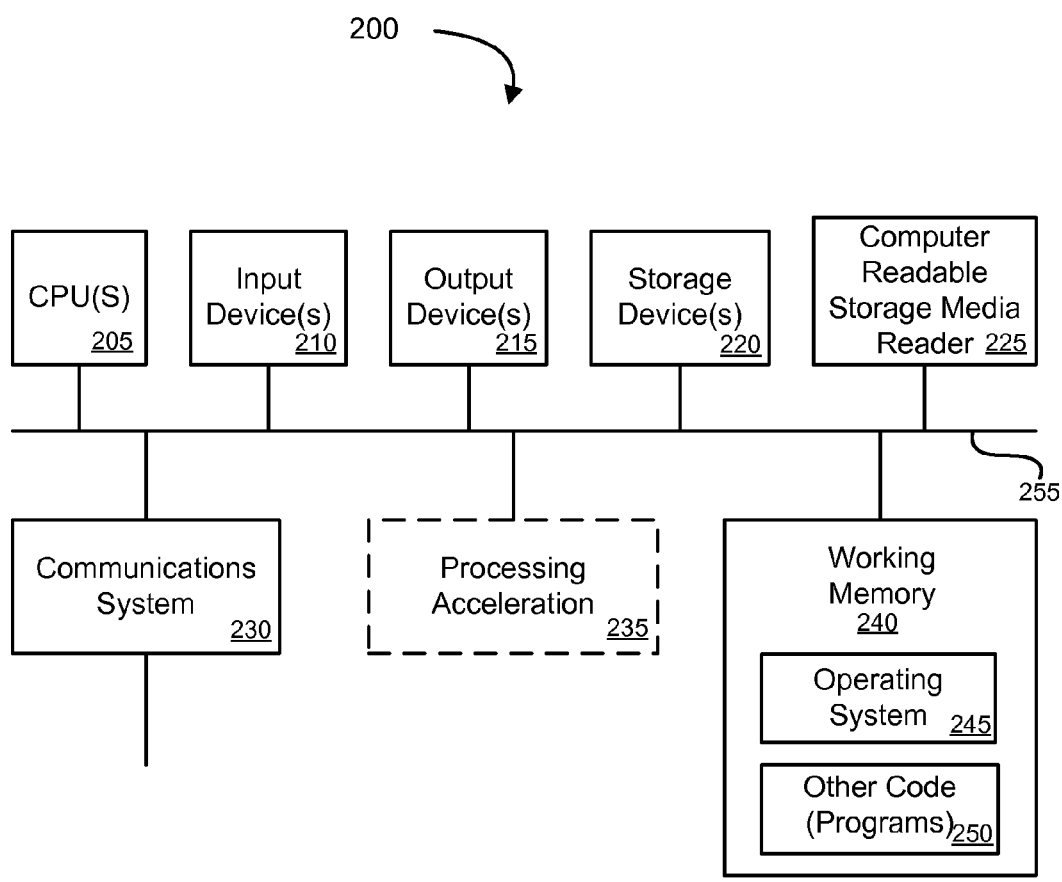
FIG. 2 is a block diagram illustrating an exemplary computer system upon which embodiments of the present invention may be implemented.

FIG. 2 is a block diagram illustrating an exemplary computer system upon which various elements of the exemplary environment illustrated in FIG. 1 may be implemented. The computer system 200 is shown comprising hardware elements that may be electrically coupled via a bus 255. The hardware elements may include one or more central processing units (CPUs) 205; one or more input devices 210 (e.g. a scan device, a mouse, a keyboard, etc.); and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225; a communications system 230 (e.g., a modem, a network card (wireless or wired), an infra-red communication device, etc.); and working memory 240, which may include RAM and ROM devices as described above communicatively coupled with and readable by CPU(s) 205. In some embodiments, the computer system 200 may also include a processing acceleration unit 235, which can include a DSP, a special-purpose processor and/or the like.

The computer-readable storage media reader 225 can further be connected to a computer-readable storage medium, together (and, optionally, in combination with storage device (s) 220) comprehensively representing remote, local, fixed, and/or removable storage devices plus storage media for temporarily and/or more permanently containing computer-readable information. The communications system 230 may permit data to be exchanged with a network and/or any other computer or other type of device.

The computer system 200 may also comprise software elements, shown as being currently located within a working memory 240, including an operating system 245 and/or other code 250, such as an application program. The application programs may implement the methods of the invention as described herein. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Figure 3:
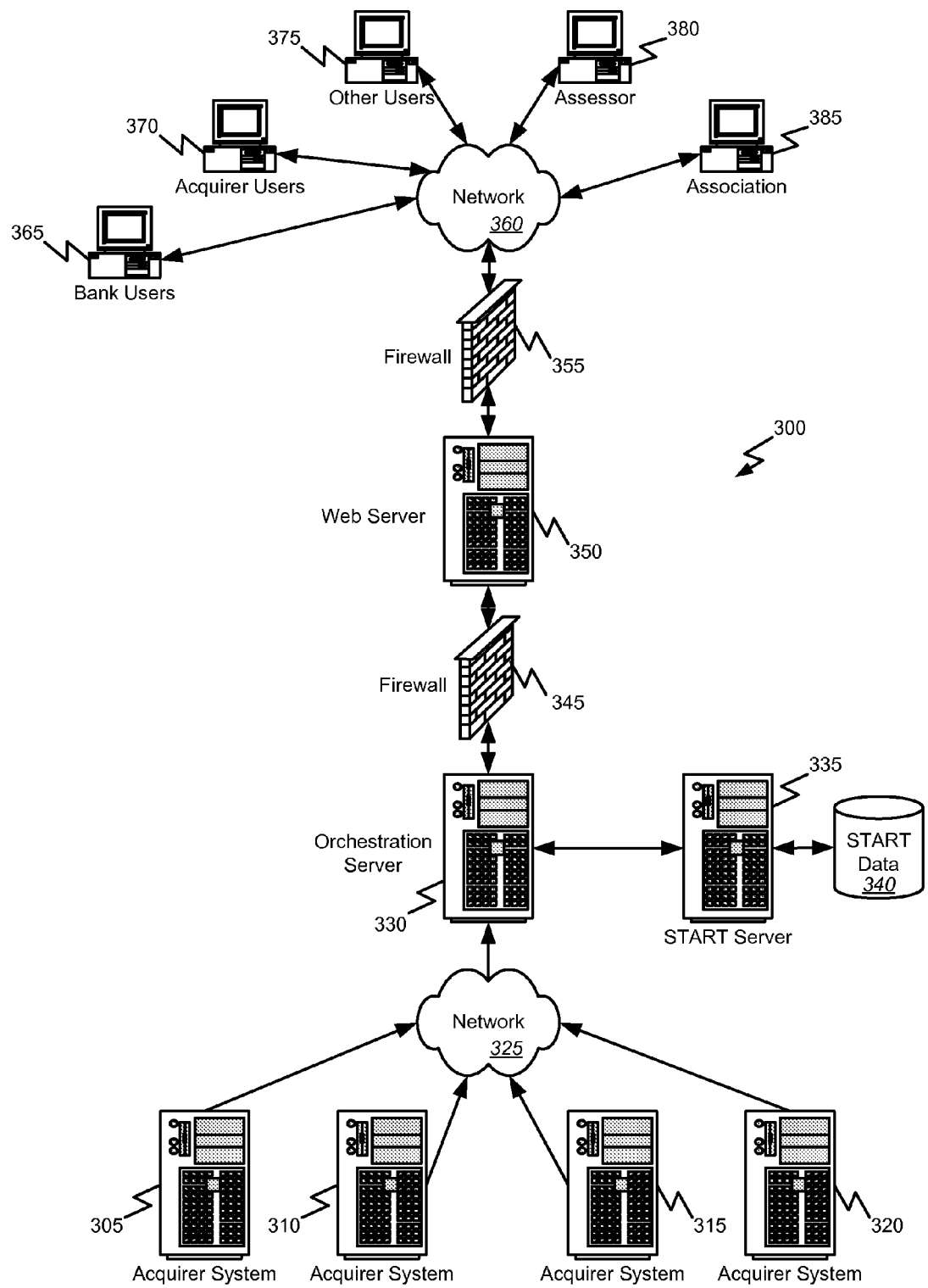
FIG. 3 is block diagram illustrating, at a high level, a system for acquiring and reporting data related to compliance with a set of requirements for securing stored data according to one embodiment of the present invention.

FIG. 3 is block diagram illustrating, at a high level, a system for acquiring and reporting data related to compliance with a set of requirements for securing stored data according to one embodiment of the present invention. In this example, the system 300 includes a first network 325 such as an intranet or another network as described above with reference to FIG. 1. The system 300 can also include any number of acquirer systems 305-320. Generally speaking, the acquirer systems 305-320 can comprise servers as described above and can be adapted to process information related to financial transactions. For example, the acquirer systems 305-320 can include but are not limited to a payments system adapted to communicate with a financial institution maintaining the financial account and authorize a transaction based on the communication with the financial institution. As noted above, the individual acquirer systems 305-320 can maintain records of these and other financial transactions for later processing and/or reporting. According to one embodiment and as will be described, each of the acquirer systems 305-320 can also be adapted to execute an extraction process to monitor the financial transaction information processed and/or maintained by the acquirer system 305-320, collect identified, relevant information from that financial transaction information, and provide that information to other elements of the system 300 for providing reports of compliance with a set of security requirements as will be described in greater detail below.

The system can also include an orchestration server 330, a Security Tracking and Reporting Tool (START) server 335, and/or a START data repository 340. Collectively, the orchestration server 330, START server 335, and START data repository 340 can be adapted to provide for collecting and reporting of information related to compliance with a set of security requirements directed to the processing and/or storage of financial transaction information handled by the acquirer systems 305-320 and/or other systems (not shown here). While the orchestration server 330, START server 335, and START data repository 340 are illustrated here as separate elements, it should be understood that in other implementations the various functions performed by these components may be performed by more, fewer, or different elements. For example, functions performed by the orchestration server and the START server can be performed by one rather than two or more separate machines. In another example, the START data repository 340 may reside on a storage medium local to (and/or resident in) the START server 335. Alternatively, it may reside on a storage medium local to (and/or resident in) the orchestration server 330. In still other cases, the START data repository may be remote from both the START server 335 and orchestration server 330, and/or in communication (e.g. via the network 325) with one or more of these. Other arrangements are contemplated and considered to be within the scope of the present invention.

Generally speaking, the orchestration server 330 can be adapted to orchestrate communications between and processing performed by various other elements of the system 300. For example, the orchestration server 330 can be adapted to receive information from the acquirer systems 305-320. As noted above, this information can be related to the processing and/or storage of financial transaction information handled by the acquirer systems 305-320. This information can be collected by an extraction process executing on the individual acquirer systems 305-320 that provides the information to the orchestration server 330. The extraction process can be executed periodically, for example, as part of a batch process at a particular time of day etc, on the occurrence of some event, or based on another criteria. Alternatively or additionally, the extraction processes of the acquirer systems or communications from the extraction processes can be initiated or requested from the orchestration server 330. The orchestration server 330 can in turn provide the information received from the acquirer systems to the START server 335 and/or the START data repository 340.

The START server 335 can be adapted to receive the information collected by the acquirer systems 305-320 from the orchestration server 330. Alternatively, the START server 335 may receive the information directly from the acquirer systems 305-320. In either case, the START server 335 can be adapted to store the information in the START data repository 340.

The START server 335 can also be adapted to perform any of a variety of other functions. For example, the START server 335 can be adapted to perform a variety of management functions including but not limited to registering users, merchant, and/or third-party providers using the system or for which information is maintained by the system, controlling access to the information in the START data repository 340. Other functions performed by the START server can include generating and/or maintaining any of a variety of reports based on the information in the START data repository 340. That is, the information stored in the START data repository 340 and/or newly received by the START server 335 can be used by the START server 335 to generate a variety of reports related to the financial transaction information and/or the parties handling and/or maintaining that information and the party's compliance with imposed security requirements.

For example, the information maintained in the START data repository 340 can include but is not limited to user administration tables maintaining information identifying and/or related to registered users of the system, access level tables maintaining information defining permission for the registered users to access information or other resources or perform various functions within the system, third-party provider tables identifying various registered third-party providers and defining authentication and/or authorization information for or related to those providers, merchant master data identifying registered merchants for which information is processed or maintained by the various acquirer or other systems, merchant transaction data related financial transactions processed for or the identified, registered merchants, and/or compliance information identifying compliance completion and/or target dates, goals, etc. for the registered third-party providers and/or merchants.

Reports generated by the START server 335 based on the information in the START data repository 340 can include, for example, various periodic (e.g., daily, weekly, monthly, etc) reports providing summary and/or detailed information on the various transactions handled by the system. These reports can be organized or divided based on the merchant or third-party provider for which the transactions are handled. Other reports can be organized or divided based on the acquirer system through which the financial transactions were processed or the information collected. Any or all of these reports can also include compliance information related to the registered merchants and/or third-party providers. For example, a report generated for or including transaction processed for a particular merchant may include information related to that merchant's compliance with security measures imposed on that merchant such as compliance completion and/or target dates, goals, etc.

The system 300 can also comprise a web server 350 communicatively coupled with the orchestration server 330. As illustrated here, a firewall 345 as known in the art may be utilized between the web server 350 and orchestration server 330 to prevent unauthorized access to the orchestration server 330, START server 335, START data repository 340, and/or acquirer systems 305-320 by those accessing the web server 350. Generally speaking, the web server 350 can be adapted to provide a graphical, web based interface (i.e., a set of web pages) for the various functions of the system 300. For example, the web server 350 can present one or more web pages through which management functions of the START server 335 can be accessed. Therefore, such web pages can provide an interface for registering users, merchant, and/or third-party providers and/or defining information for controlling access to the system for those users. Other functions of the START server 335 that may be accessed through the web server 350 can include various reporting functions. For example, though one or more web pages of the web server 350, a user may be able to define, request, and/or view a variety of reports based on the information in the START data repository 340.

The system can also include a second network 360 such as the Internet or another network as described above with reference to FIG. 1. It should be understood that in other embodiments, rather than two separate networks 325 and 360, the system may be implemented using one network such as the Internet or other network as described above. The web server 350 can be communicatively with the second network 360. As illustrated here, a firewall 355 as known in the art may be utilized between the web server 350 and the second network 360 to prevent unauthorized access to the web server 350, orchestration server 330, START server 335, START data repository 340, and/or acquirer systems 305-320 via the second network 360.

Also communicatively coupled with the second network 360 can be a number of user computers 365-385 or devices. The user computers 365-385 can include, but are not limited to, one or more bank user systems 365 through which a user at or for a bank or other financial system registered with the system may access the web server 350, one or more acquirer user systems 370 through which a user at or for an acquirer participating in the system may access the web server 350, one or more assessor systems 380 through which a registered security assessor may access the web server 350, one or more association systems 385 through which a user for a business association member participating in the system may access the web server 350, and one or more other user systems 375 through which other types of users may access the web server 350.

Each of the user computers 365-385 can be adapted to access the web server 350 via the second network 360 for performing various functions and viewing various reports relevant to persons operating the respective user computer 365-385 and for which those persons are authorized. For example, via the web server 350 an acquirer or bank user can log onto the START server 335 and register a merchant of third-party provider. Alternatively or additionally, the acquirer or bank user may request and receive, via the web server, one or more reports based on the information in the START data repository 340. In yet another example, an assessor 380 may be able to log on and access, via the web server 350 and START server, compliance information in the START data repository for a particular merchant or third-party provider. Importantly, the content, appearance, format, etc of the interface presented by the web server 350 can vary significantly between implementations without departing from the scope of the present invention.

In an exemplary use of the system 300, a user can access the system 300 through one of the user systems 365-385 and interact with the system 300 via the interface provided by the web server 350. For example, an administrator or other person can log onto the START server 335 via a log in page or other interface provided by the web server 350. Once identified and authenticated, the administrator or other person can access the functions of the START server 335 for which he is authorized.

As noted above, the functions of the START server 335 can include any number of management functions. One such function may be to register entities, e.g., merchants, third-party providers, or others, for which financial transaction information is handled by the acquirer systems 305-320. Therefore, an administrator or other authorized person accessing the START server 335 may, via interface(s) provided by the web server 350, invoke and perform a registration process. The registration process can include, for example, defining identifying information for the entity and/or users associated with that entity including possibly a group definition, i.e., a group to which the entity belongs, defining access privileges for the entity and/or users associated with that entity, defining roles for the entity and/or users associated with the entity, etc. Such information can then be saved by the START server, for example, in the START data repository in one or more user definition tables.

Once an entity has been registered, the START server can begin tracking financial transaction information handled by the acquirer systems 305-320 as well as compliance information for that entity. For example, as one or more of the acquirer systems 305 process financial transaction information for the entity, an extraction process as described above can extract information related to those transactions. This information can be provided to the orchestration server 330 and/or the START server 335, for example as part of a periodic batch process. The START server 335, upon receiving the collected information, can determine whether the entity to which the information is related is a registered entity. If so, the START server 335 can record the collected information, for example in one or more tables associated with that entity in the START data repository 340.

As noted above, compliance information, i.e., information related to the entity's compliance with a set of requirements for securing financial transaction information, can also be maintained in the START data repository 340. For example, a user of one of the user systems 365-385 such as an assessor system 380, acquirer system 370, bank system 365 or other can access, i.e., log onto the system 300 via the web server 350 and, if authenticated and properly authorized, provide via an interface of the web server 350 compliance information for the registered entity. Such compliance information may include, for example, a compliance status, a compliance completion date, a compliance completion target date, a date since a last compliance audit, and other possible data. Such information can then be stored by the START server 335, for example in one or more tables associated with the entity in the START data repository 340.

Once tracking information and compliance information has been stored by the START server 335, such information can then be available for use in reports presented through the web server 350. For example, a user of one of the user systems 365-385 such as an assessor system 380, acquirer system 370, bank system 365 or other can access, i.e., log onto the system 300 via the web server 350 and, if authenticated and properly authorized, request one or more reports to be presented through an interface of the web server 350. The reports can include both detailed and summary types reports. For example, reports presented through the web server 350 based on the tracking and compliance information maintained by the START server 335 can present such information as a total number of transactions, a total dollar amount for those transactions, and other summary type information or may include details of individual transactions or groups of transactions, e.g., by day, by week, by month, by merchant(s), by merchant group(s), etc. Furthermore, these and other possible reports can be divided based on the entity for which the information is tracked, a group to which the entity belongs or is associated, the channel through which the financial transaction information is handled, i.e., the entity or third-party provider and acquirer system processing the transaction, or based on other criteria. Finally, as noted above, the reports can include the compliance information related to the entity, a group to which the entity belongs, etc. The tracking information and compliance information can be presented in the report in any of a variety ways such as through various charts or graphs to provide a view of the collected information through which the user can identify non-compliance of various entities in order to assess levels of compliance, progress towards achieving compliance, risks associated with non-compliance, etc.

Stated yet another way, a system 300 for tracking and reporting information related to compliance with a set of security requirements by one or more entities handling financial transaction information can comprise one or more acquirer systems 305-320. Each of the acquirer systems 305-320 can be adapted to process information related to a plurality of financial transactions for entities involved in the transaction. A tracking and reporting system, i.e., orchestration server 330 and START server 335, can be communicatively coupled with each of the acquirer systems 305-320. The tracking and reporting system can be adapted to collect at least a subset of the information related to the plurality of financial transactions, collect compliance information related to the entities involved in the transaction, the compliance information for each entity indicating that entity's compliance with the set of security requirements, and generate one or more reports based on the information related to the plurality of financial transactions and the compliance information.

The system 300 can also include a web server 350 communicatively coupled with the tracking and reporting system, e.g., via the orchestration server 330. The web server 350 can be adapted to receive the one or more reports from the tracking and reporting system and present the one or more reports as one or more web pages. The web server 350 can also be adapted to provide an interface for receiving the compliance information from a user. The tracking and reporting system can be adapted to receive the compliance information from the web server 350.

The tracking and reporting system can further comprise a central data repository, e.g., START data repository 340. The central data repository 340 can be adapted to maintain the information related to the plurality of financial transactions and the compliance information. In such a case, the tracking and reporting system can generate the one or more reports based on the information related to the plurality of financial transactions and the compliance information stored in the central repository 340.

Each acquirer system 305-320 can be adapted to execute an extraction process. The extraction process can be adapted to monitor the information related to the plurality of financial transactions processed by the acquirer system and extract the subset of the information related to the plurality of financial transactions. The extraction process can be further adapted to send the subset of the information related to the plurality of financial transactions to the tracking and reporting system. The tracking and reporting system can be adapted to receive the subset of the information related to the plurality of financial transactions from the extraction process of the acquirer system and write the subset of the information related to the plurality of financial transactions to the central data repository. In some cases, the tracking and reporting system can be further adapted to first determine whether the subset of the information related to the plurality of financial transactions corresponds to an entity registered with the tracking and reporting system. In such a case, the tracking and reporting system can write the subset of the information related to the plurality of financial transactions to the central data repository in response to determining the subset of the information related to the plurality of financial transactions corresponds to an entity registered with the tracking and reporting system.

Figure 4:
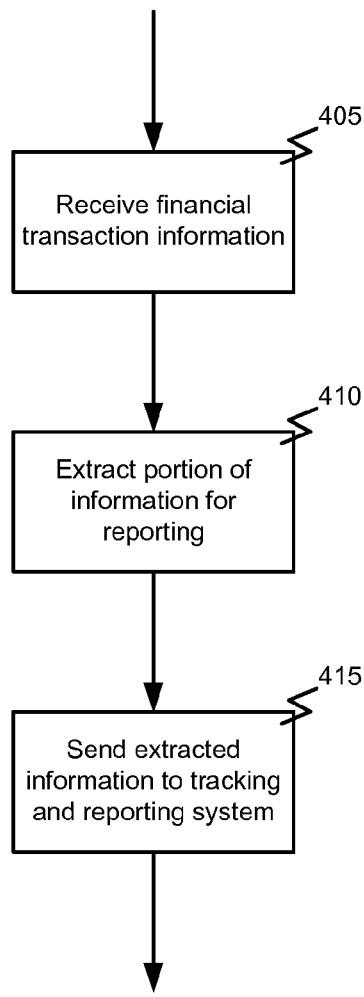
FIG. 4 is a flowchart illustrating an exemplary extraction process for an acquirer system according to one embodiment of the present invention.

FIG. 4 is a flowchart illustrating an exemplary extraction process for an acquirer system according to one embodiment of the present invention. In this example, the process begins with the acquirer system receiving 405 financial transaction information. For example, the acquirer system may receive a request from a merchant or a third-party provider to authorize a transaction such as a credit card, debit card, check, or other transaction. At least a portion of this information can be extracted 410 for reporting purposes. The information to be extracted can be based on a predetermined algorithm of the extraction process identifying those fields to be collected or extract, based on an external file or set of configuration information used by the extraction process and identifying those fields to be extracted, or based on another criteria. In some cases, all of the data related to the transaction may be extracted 410. The extracted data can then be sent 415 to the tracking and reporting system to be, for example, stored in a central repository and/or used in generating one or more reports.

Figure 5:
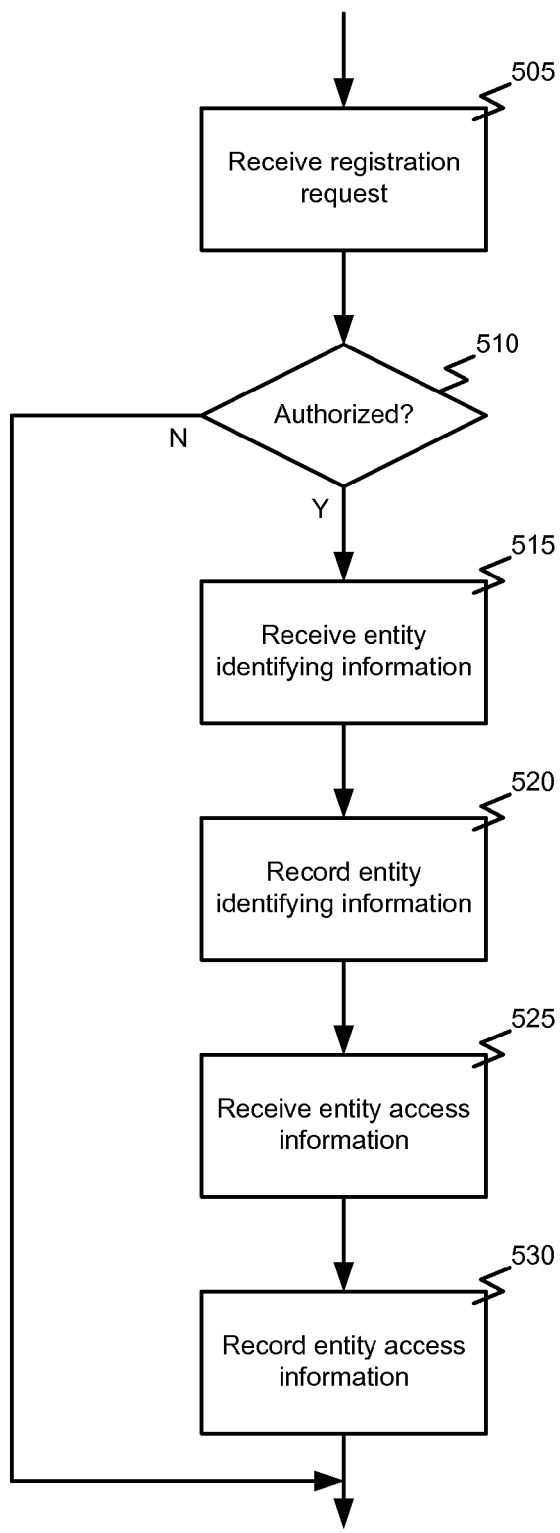
FIG. 5 is a flowchart illustrating an exemplary registration process for a tracking and reporting system according to one embodiment of the present invention.

FIG. 5 is a flowchart illustrating an exemplary registration process for a tracking and reporting system according to one embodiment of the present invention. In this example, the process begins with receiving 505 a registration request. As noted above, receiving 505 the notification request can comprise receiving the request via an interface presented by the web server. For example, the request may be received in response to a user clicking a button or link or otherwise manipulating an element of a web page or other interface. A determination 510 can be made as to whether the user requesting registration services is authorized to perform such a task. This determination 510 can be based, for example, on login or other credentials or information provided by the user through the web server interface.

If a determination 510 is made that the user requesting registration services is authorized to perform such a task, entity identifying information can be received 515 and stored 520, for example in a central repository such as the START data repository described above. The entity identifying information can be received via the interface provided by the web server, for example, by the user filling text boxes, checking checkboxes, or otherwise manipulating the interface provided by the web server. As noted above, the entity identifying information can include user names or other identifiers, an indication of one or more groups with which the user is associated, one or more roles for the user, etc.

In some cases, entity access information may also be received 525 and stored 530. Again, the entity access information can be stored, for example in a central repository such as the START data repository described above. The entity access information can be received via the interface provided by the web server, for example, by the user filling text boxes, checking checkboxes, or otherwise manipulating the interface provided by the web server. As noted above, the entity access information can include information defining access levels or permissions for the user when requesting reports, requesting management services of the tracking and reporting system, or otherwise interacting with or requesting services of the system.

Figure 6:
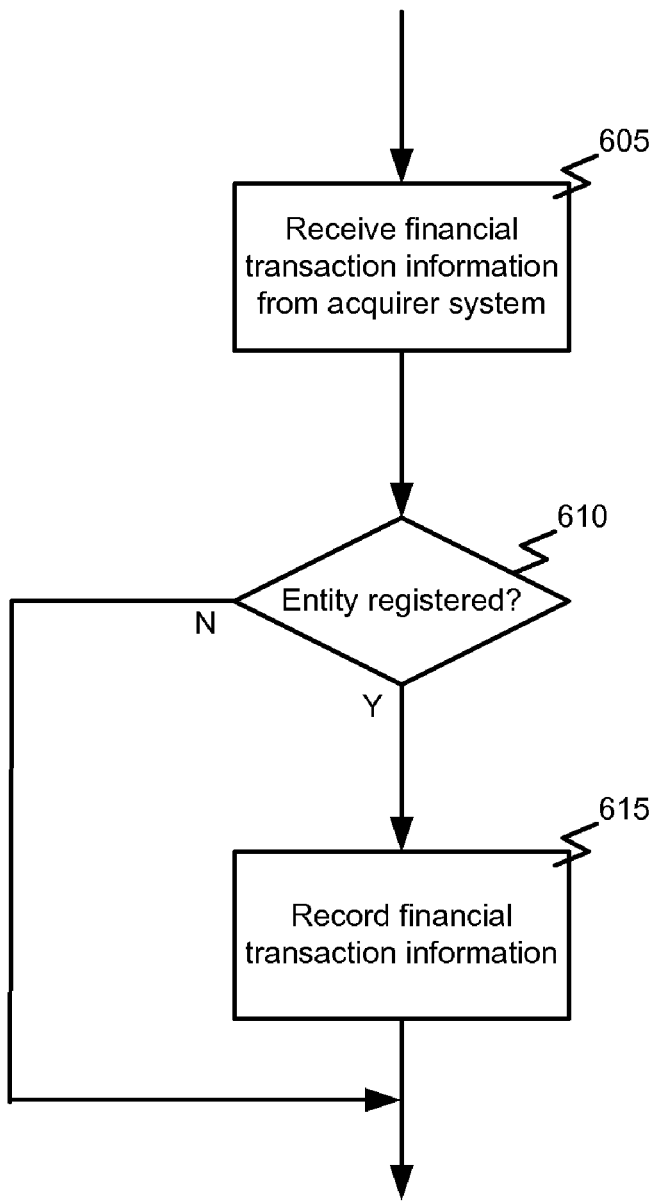
FIG. 6 is a flowchart illustrating an exemplary data collection process for a tracking and reporting system according to one embodiment of the present invention.

FIG. 6 is a flowchart illustrating an exemplary data collection process for a tracking and reporting system according to one embodiment of the present invention. In this example, the process begins with the tracking and reporting system, e.g., the orchestration server and/or START server described above, receiving 605 financial transaction information from an acquirer system, for example from an extraction process as described above. A determination 610 can be made as to whether the financial transaction information is related to a registered entity. If a determination 610 is made that the information is related to a registered entity, the financial transaction information can be recorded 615 or saved, for example in a central repository such as the START data repository described above.

Figure 7:
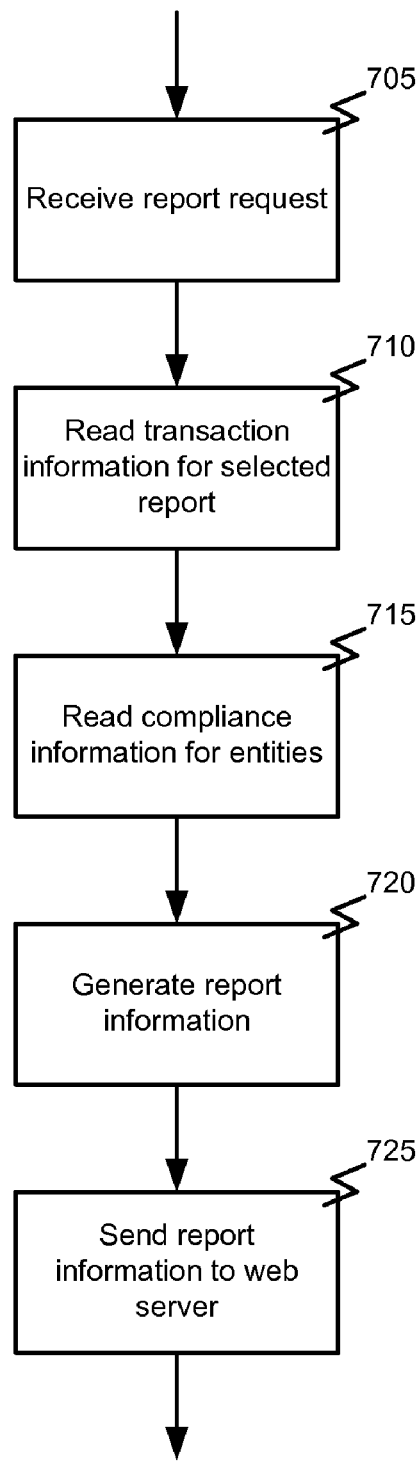
FIG. 7 is a flowchart illustrating an exemplary reporting process for a tracking and reporting system according to one embodiment of the present invention.

FIG. 7 is a flowchart illustrating an exemplary reporting process for a tracking and reporting system according to one embodiment of the present invention. In this example, processing begins with the tracking and reporting system, e.g., the orchestration server and/or START server described above, receiving 705 a report request. As noted above, the report request can be received 705 from the web server, for example, in response to a user clicking a button or link or otherwise manipulating an element of a web page or other interface. Additionally, compliance information for entities related to the transactions can also be read 720. Stored transaction information and/or compliance information for the requested report can be read 710 and 715, for example, from a central repository such as the START data repository described above. The information to be read 710 and 715 and used for the report can be defined or described for a particular requested report in any of a variety of conventional manners. For example, a report can be predefined and a corresponding definition can be saved in the form of a template or other set descriptive information that defines the information to be used for the report.

Once the transaction information and the compliance information has been read 710 and 715, a report can be generated 720 and sent 725 to the web server for rendering. Generating 725 the report can also be based defined or described for a particular requested report in any of a variety of conventional manners. For example, a report format can be predefined and a corresponding definition can be saved in the form of a template or other set descriptive information that defines the report. As can be understood by one skilled in the art, the format, structure, and content of the report information sent to the web server for rendering can vary widely depending upon the exact implementation. For example, the report information sent to the web server may comprise a fully formed web page defined in HyperText Markup Language (HTML) ready to be server by the web server. In other cases, the raw information in various formats may be sent to the web server for generation of or insertion into the web page in which the report information will be presented. Various other embodiments are contemplated and considered to be within the scope of the present invention.

In the foregoing description, for the purposes of illustration, methods were described in a particular order. It should be appreciated that in alternate embodiments, the methods may be performed in a different order than that described. Additionally, the methods may contain additional or fewer steps than described above. It should also be appreciated that the methods described above may be performed by hardware components or may be embodied in sequences of machine-executable instructions, which may be used to cause a machine, such as a general-purpose or special-purpose processor or logic circuits programmed with the instructions, to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A system for tracking and reporting information related to compliance with a set of security requirements by one or more entities handling financial transaction information, the system comprising:
   one or more acquirer systems, each of the acquirer systems comprising a computer system having at least one database for storing information and at least one processor configured to: process information related to a plurality of financial transactions for entities involved in the transaction, and execute an extraction process, wherein the extraction process:
      monitors the information related to the plurality of financial transactions processed by the acquirer system,
      determines a subset of information from the information is relevant to one or more entities' compliance with a set of security requirements imposed on those entities:
      extracts the subset of information, and
      sends the subset of information to a tracking and reporting system communicatively coupled with each of the acquirer systems; and wherein the tracking and reporting system comprises a computer having a processor and a central data repository configured to maintain the information related to the plurality of financial transactions and the compliance information, and wherein the processor is configured to:
      collect the subset of information,
      collect compliance information from the entities involved in the transaction, the compliance information for each entity indicating that entity's compliance with the set of security requirements imposed on that entity for securing financial transaction information,
      generate one or more reports based on the information related to the plurality of financial transactions and the compliance information,
      determine whether the subset of information corresponds to an entity registered with the tracking and reporting system, and
      write the subset of information to the central data repository in response to determining the subset of information corresponds to an entity registered with the tracking and reporting system.

2. The system of claim 1, wherein the system further comprises a web server communicatively coupled with the tracking and reporting system.

3. The system of claim 2, wherein the web server is adapted to receive the one or more reports from the tracking and reporting system and present the one or more reports as one or more web pages.

4. The system of claim 1, wherein the tracking and reporting system generates the one or more reports based on the information related to the plurality of financial transactions and the compliance information stored in the central repository.

5. The system of claim 2, wherein the web server is adapted to provide an interface for receiving the compliance information from a user.

6. The system of claim 5, wherein the tracking and reporting system is adapted to receive the compliance information from the web server.

7. A method of tracking compliance with a set of security requirements by one or more entities handling financial transaction information, the method comprising:
   with a tracking and reporting system, collecting information related to a financial transaction from at least one acquirer system processing the information related to the financial transaction, wherein collecting information related to the financial transaction from at least one acquirer system comprises:
      receiving the information related to the financial transaction from the at least one acquirer system,
      determining whether the information related to the financial transaction corresponds to a registered entity, and
      in response to determining the information related to the financial transaction corresponds to a registered entity, writing the information related to the financial transaction in a central data repository;
   collecting compliance information related to the entities involved in the transaction with the tracking and reporting system, the compliance information for each entity indicating that entity's compliance with the set of security requirements; and
   generating with the tracking and reporting system, one or more reports based on the information related to the financial transaction and the compliance information, wherein the reports include information about an entity's compliance with security measures imposed on that entity.

8. The method of claim 7, wherein generating the one or more reports comprises generating one or more web pages.

9. The method of claim 7, wherein generating one or more reports based on the information related to the financial transaction and the compliance information is based on the information related to the financial transaction stored in the central data repository.

10. The method of claim 7, further comprising receiving the compliance information related to the entities involved in the transaction via a web-based interface.

11. The method of claim 10, further comprising storing the compliance information related to the entities involved in the transaction in a central data repository and wherein generating one or more reports based on the information related to the financial transaction and the compliance information is based on the compliance information stored in the central repository.

12. A machine-readable medium having stored thereon a series of instructions which, when executed by a processor, causes the processor to track compliance with a set of security requirements by:
  collecting information related to a financial transaction from at least one acquirer system processing the information related to the financial transaction comprising:
    receiving the information related to the financial transaction from the at least one acquirer system,
    determining whether the information related to the financial transaction corresponds to a registered entity, and
    in response to determining the information related to the financial transaction corresponds to a registered entity, writing the information related to the financial transaction in a central data repository;
  collecting compliance information related to the entities involved in the transaction, the compliance information for each entity indicating that entity's compliance with the set of security requirements; and
  generating one or more reports based on the information related to the financial transaction and the compliance information, wherein the reports include information about an entity's compliance with security measures imposed on that entity, and wherein the content of the reports is based on the requestor of the report.

13. The machine-readable medium of claim 12, wherein generating the one or more reports comprises generating one or more web pages.

14. The machine-readable medium of claim 12, wherein generating one or more reports based on the information related to the financial transaction and the compliance information is based on the information related to the financial transaction stored in the central data repository.

15. The machine-readable medium of claim 12, further comprising receiving the compliance information related to the entities involved in the transaction via a web-based interface.

16. The machine-readable medium of claim 15, further comprising storing the compliance information related to the entities involved in the transaction in a central data repository and wherein generating one or more reports based on the information related to the financial transaction and the compliance information is based on the compliance information stored in the central repository.

* * * * *